Patented Nov. 29, 1927.

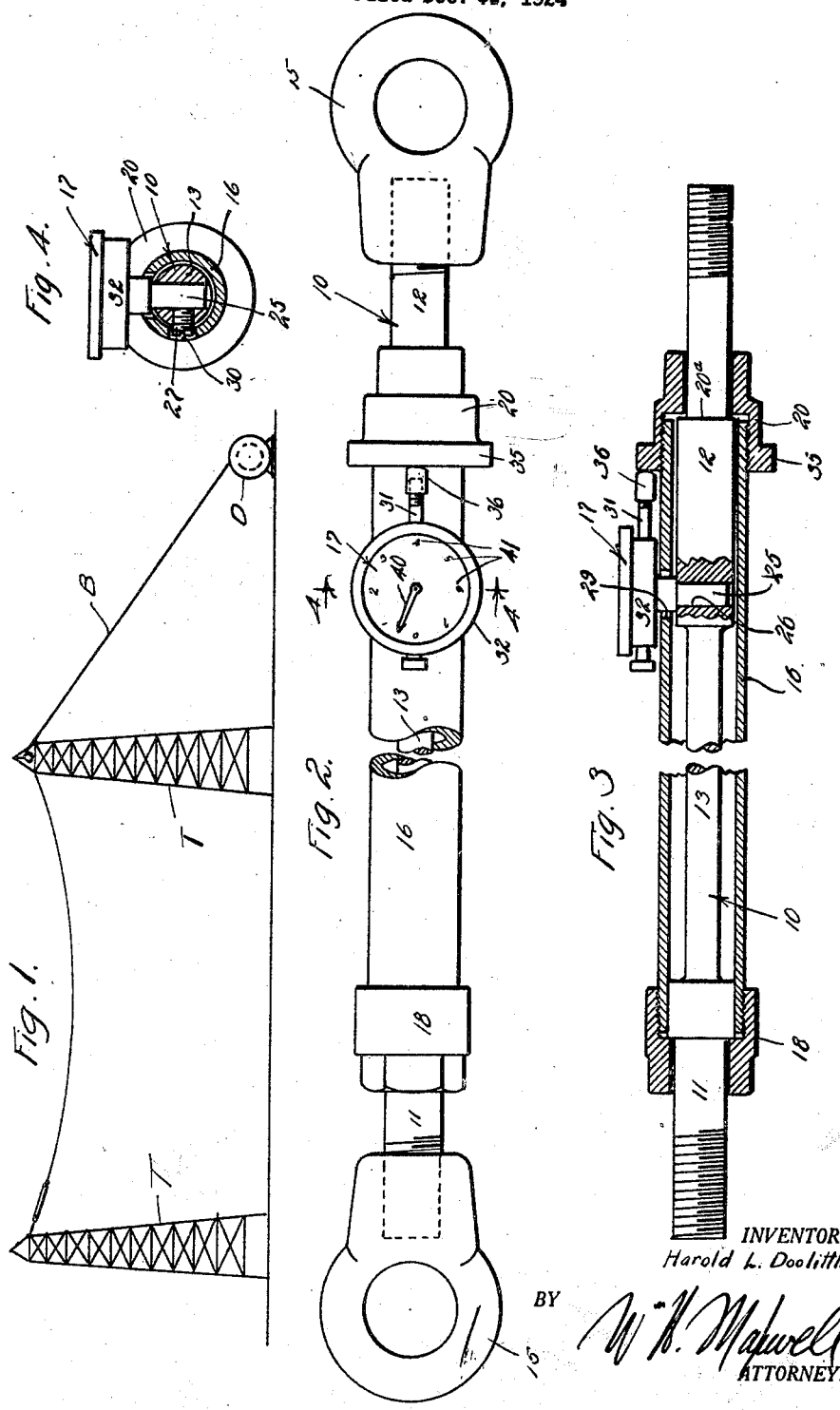

1,650,789

UNITED STATES PATENT OFFICE.

HAROLD L. DOOLITTLE, OF PASADENA, CALIFORNIA.

INSTRUMENT FOR INDICATING TENSILE STRAIN.

Application filed December 31, 1924. Serial No. 759,071.

This invention has to do with an instrument for indicating tensile strain and it is an object of the invention to provide a simple, practical and effective device of this character.

The instrument provided by my invention is useful for measuring various forces, it being particularly useful, however, for measuring tension.

Tension gages are used in various situations and in various classes of work and ordinarily include springs or other parts which make them more or less complicated, expensive and unreliable.

The gage provided by this invention includes various novel features and improvements and is useful in many situations, for instance, it is proving very useful in stringing wires or cables such as power transmission cables. I will throughout this specification set forth a form of the invention suitable for the use just mentioned and will describe the operation of the device in that specific application, it being understood that such reference is merely for the purpose of facilitating a full and clear understanding of the principles of the invention and is not to be construed as limiting the invention to such specific details or application.

The objects and features of my invention will be best and more fully understood from the following detailed description of a typical form and application of the invention throughout which description reference is had to the accompanying drawings in which Fig. 1 is a diagrammatic view illustrating a typical application of the device provided by this invention.

Fig. 2 is a view showing the device provided by the invention.

Fig. 3 is a longituidnal detailed sectional view of the device and

Fig. 4 is a transverse sectional view of the device taken as indicated by line 4—4 on Fig. 2.

The device embodying the present invention comprises, generally, a tension member 10, adapted to be subjected directly to the force or strain to be measured, and means for indicating operations of the tension member.

The tension member 10 is, in accordance with the present invention, in the form of a steel bar having an elongate body 13 with enlarged end parts 11 and 12. The tension member is, in practice, formed of steel having a very high elastic limit and tensile strength. The body 13 of the tension member is comparatively long and slender, being proportioned so that it is stretched by tensile strains applied through the ends 11 and 12. The body 13 is preferably round in cross-sectional configuration and is uniform in size and shape throughout its length so that it stretches uniformly throughout its length when under strain. When the device is to be used for the particular purpose herein set forth it is practical to form the tension member out of what is known commercially as chrome vanadium axle steel, and to form the body part 13 by turning and finishing the middle portion of a bar. The end parts 11 and 12 of the tension member are provided for connecting the tension member with the part or parts transmitting the strain to be indicated. The particular finish or attachment to be provided on the ends 11 and 12 will, of course, depend upon the character of the parts to which the ends are to be connected or the mode of connection to be employed. In the particular case under consideration the device is to be connected between two cables, so therefore it is convenient to provide eyelets 15 on the ends 11 and 12 suitable for receiving cables, or the like. Although the eyelets 15 might be formed directly on or in the ends 11 and 12, it is most practical to attach them to the ends of 11 and 12 by screw-threads as shown in the drawings. The outer parts of the ends 11 and 12 are somewhat reduced and screw-threaded to screw into screw-threaded sockets provided in the eyelets.

The means provided for indicating the amount of stretch or extension occurring in the tension member includes a part 16 fixed to one end of the tension member and extending to the other end of the tension member where it is free and an instrument 17 arranged to indicate movement between the free end of said part and said other end of the tension member. The part 16 is preferably in the form of a tube or sleeve fixed to one end of the tension member, for instance, to the end 11 so that it extends freely over the body 13 of the tension member to the end 12. In the construction shown in the drawings the sleeve 16 is forced tightly onto the end 11 adjacent the body 13 and is further held tight on the end 11 by a locking member 18 which screw threads onto or over the end of the sleeve. At the end 12 the sleeve 16 is provided with a head 20 which slidably fits the reduced outer part of end 12 and operates to support the free end of the sleeve. The head 20 may be screw-threaded to the sleve. The head 20 is adapted to cooperate with the shoulder 20ª, formed on the end 12 by the reduction of the outer part of the end, to hold the end 12, if the body of the tension member fails.

The instrument 17 provided for indicating movement between the end 12 of the tension member and the free end of the sleeve 16 is in the present case mounted on the end 12 so that it indicates movement of the sleeve relative to the end 12. The body 32 of the instrument is mounted on the end 12 adjacent the body 13 of the tension member by means of a projection 25 provided on the body 32. The projection slidably fits an opening 26 provided in the end 12. Means, such as a set screw 27, may be provided for firmly setting the part 25 in the opening 26. The sleeve 16 extends over that portion of the end 12 on which the instrument is mounted and is therefore provided with openings 29 and 30 which freely pass the projection 25 and set screw 27, respectively. The openings 29 and 30 are in practice made sufficiently large so that they do not in any way interfere with the operation of the device as hereinafter described. The operating part 31 of the instrument projects from the body 32 thereof, to cooperate with a part of the sleeve 16. In the particular arrangement illustrated in the drawings, the head 20 on the free end of the sleeve is provided with a flange part 35, which engages the operating part 31 of the instrument. The operating part of the instrument is provided with an adjustable end 36 whereby the relationing of the operating part and flange 35 may be accurately set or adjusted, for instance, to compensate the expansion or contraction of the various parts of the device. The instrument 17, which, of course, may be of any suitable construction, includes an indicating part or hand 40 which cooperates with a suitable scale 41. The instrument is such that movement of the operating part 31 with relation to the body 32, in this case toward the body 32, causes movement of the hand 40 with relation to the scale. In practice the instrument 17 may be such that the hand and scale cooperate to indicate in suitable units the tension to which the tension member is subjected.

In using the device while stringing a power transmission cable, one end of the tension member 13 may be connected with a tower T and the other end with the cable B, being strung. In the diagram Fig. 1 I have indicated the cable B being strung on the towers T by means of a drum D. With the arrangement just described the device provided by my invention is directly connected between the cable B and one of the towers so that all of the strain or pull caused by the winding of the cable onto the drum D is transmitted directly through the tension member 10. Before the strain is applied to the device the operating part 31 of the instrument is adjusted through the end 36 so that the instrument indicated zero. As strain is applied the body 13 of the tension member stretches causing the end 12 to move relative to the free end of the sleeve 16, which movement causes operation of the instrument 17 causing the instrument to indicate the strain. By observing the instrument 17 as the cable B is being strung overstrain of the cable B can be avoided and the cable B can be strung on the towers T under tension known to be within proper limits of safety.

When the device is not in use the instrument 17 which is the only delicate part of the device, can be removed by releasing the set screw. In handling the device, for instance, in transporting it from place to place the instrument 17 which is small and light can be carefully carried in a suitable case, while the remaining parts can be handled without particular care as there is nothing about them to be injured or broken. The sleeve 16 forms a housing for the body part 13 of the tension member and thus protects it against injury.

It is to be noted that my invention has provided a tension gage which is strong and durable and which is without springs or other parts subject to failure or requiring cumbersome or expensive construction.

Having described only a typical preferred form of my invention I do not wish to limit myself to the specific details hereinabove set forth, but wish to reserve to myself any changes or variations that may appear to those skilled in the art or fall within the scope of the following claims:

Having described my invention, I claim:

1. An instrument for indicating tensile strain including, a tension member in the form of a bar, having a long slender body extending between enlarged end parts, a sleeve fixed to one end part and extending freely over the body to the other end part, and means for indicating movement between the free end of the sleeve and the last mentioned end part.

2. An instrument for indicating tensile strain including, two parts, one a tension bar, the other a sleeve fixed to one end of the bar and extending freely over the bar to its other end, and an instrument detachably mounted on one of said parts to co-operate with the other part and indicate movement between the free end of the sleeve and the last mentioned end of the bar.

3. An instrument for indicating tensile strain including, a tension bar, a sleeve fixed to one end of the bar and extending freely over the bar to its other end, the sleeve having a projection on its free end, and a measuring instrument mounted on the bar to be actuated by the projection to indicate movement between the free end of the sleeve and the last mentioned end of the bar.

4. An instrument for indicating tensile strain including, a tension bar, a sleeve fixed to one end of the bar and extending freely over the bar to its other end, a head on the free end of the sleeve slidably fitting the bar, and a measuring instrument mounted on the bar to be actuated by the head to indicate movement between the free end of the sleeve and the last mentioned end of the bar.

5. An instrument for indicating tensile strain including, a tension member in the form of a steel bar having a long slender body uniform in size and shape, extending between enlarged end parts, a sleeve fixed to one end part and extending freely over the body to the other end part, a head on the free end of the sleeve slidably fitting the last mentioned end part and having a flange part, the last mentioned end part having an opening within the sleeve, the sleeve having an opening registering with the opening in the end part, a measuring instrument and a projection on the instrument to extend freely through the opening in the sleeve and to slidably fit the opening in the end part to mount the instrument on the end part so that it is cooperatively related to the flange part.

In witness that I claim the foregoing I have hereunto subscribed my name this 19th day of December, 1924.

HAROLD L. DOOLITTLE.